Figure 1:
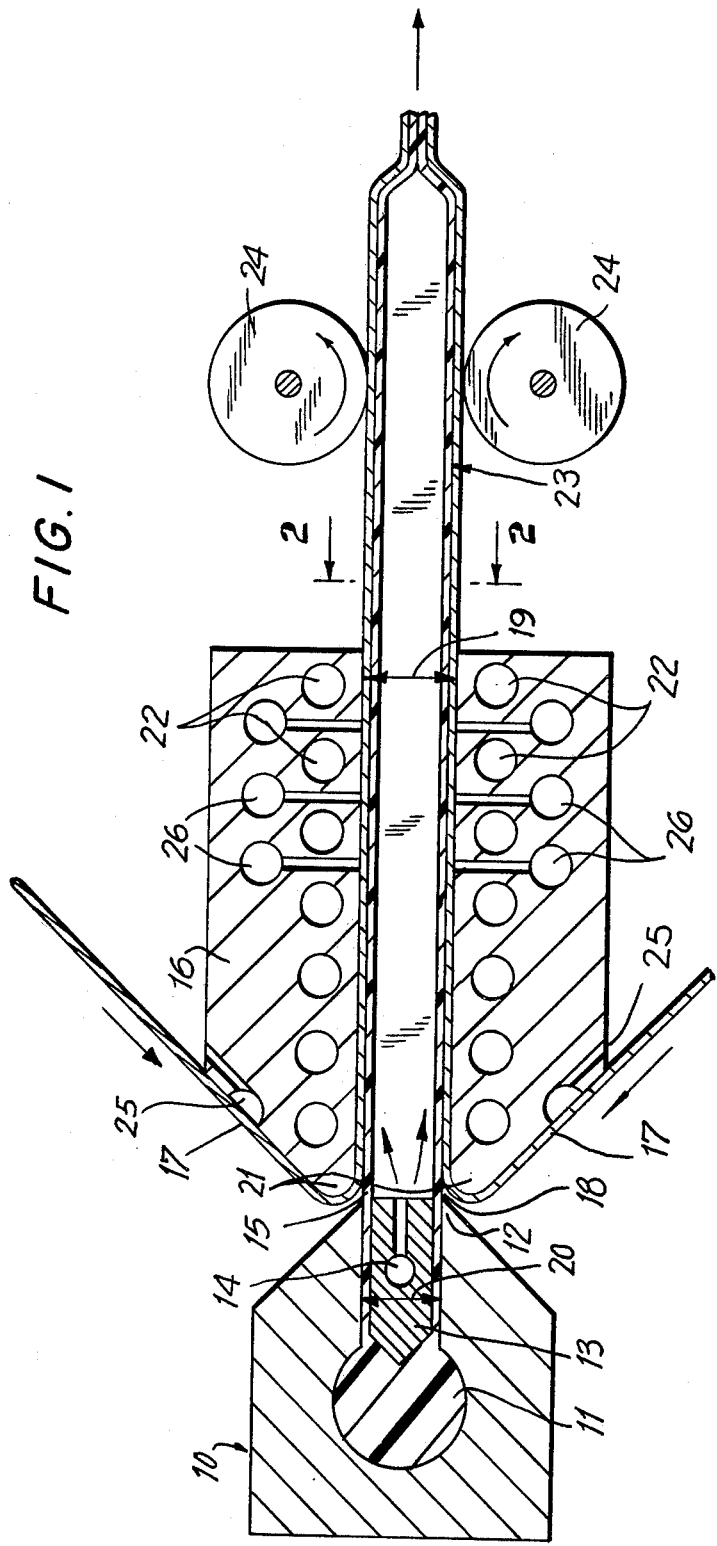

United States Patent [19]

Vetter et al.

[11] 4,261,777
[45] Apr. 14, 1981

[54] METHOD AND APPARATUS FOR MAKING A FILM-COATED SYNTHETIC RESIN TUBE

[75] Inventors: Heinz Vetter, Rossdorf; Franz Wenzel, Darmstadt, both of Fed. Rep. of Germany

[73] Assignee: Röhm GmbH, Darmstadt, Fed. Rep. of Germany

[21] Appl. No.: 963,213

[22] Filed: Nov. 24, 1978

[30] Foreign Application Priority Data

Nov. 29, 1977 [DE] Fed. Rep. of Germany ....... 2753103

[51] Int. Cl.³ .............................................. B29D 23/04
[52] U.S. Cl. .......................... 156/244.13; 156/244.14; 156/244.27; 156/285; 156/498; 156/500; 264/563; 264/565; 264/566
[58] Field of Search ...................... 156/244.13, 244.14, 156/244.24, 244.27, 500, 498, 285; 264/209, 510, 512, 514, 515, 540, 563, 565, 566, 569, 573, 268, 173

[56] References Cited

U.S. PATENT DOCUMENTS

| 2,958,364 | 11/1960 | Thompson | 156/244.14 |
| 3,336,176 | 8/1967 | Medney | 156/244.14 |
| 3,668,288 | 6/1972 | Takahashi | 264/566 |
| 3,843,438 | 10/1974 | Gabriel | 156/244.13 |
| 3,887,673 | 6/1975 | Sato et al. | 264/565 |

FOREIGN PATENT DOCUMENTS

| 1948442 | 4/1971 | Fed. Rep. of Germany . |
| 2337677 | 2/1975 | Fed. Rep. of Germany . |
| 2426543 | 12/1975 | Fed. Rep. of Germany ...... 156/244.13 |
| 2605446 | 8/1977 | Fed. Rep. of Germany . |
| 45-39189 | 12/1970 | Japan ..................................... 264/515 |

*Primary Examiner*—Caleb Weston
*Attorney, Agent, or Firm*—Curtis, Morris & Safford

[57] ABSTRACT

What is disclosed are methods and apparatus for coating a hollow synthetic resin tube with a pre-formed film coating by applying the film coating to an exterior surface of such a tube directly after extrusion, while the resin thereof is thermoplastic, and then passing them through a shaping channel while maintaining a modest pressure differential between the interior and exterior of the tube, whereby the film coating and tube are adhered by the compression thereof against the walls of the shaping channel.

7 Claims, 2 Drawing Figures

METHOD AND APPARATUS FOR MAKING A FILM-COATED SYNTHETIC RESIN TUBE

The present invention relates to methods and apparatus for making an extruded hollow tube of synthetic resin, said tube having a film coating on one or both sides.

More in particular, the film coating can be either a permanent part of the tube, serving to improve its properties or to accommodate them to particular uses, or it can afford temporary protection of the material of the tube during storage, transportation, and further handling. In this latter case, the adhesion between the tube and the film need not be of unlimited strength.

The preparation of film-coated synthetic resin tubes by the simultaneous extrusion of the material of the tube and the film and their union within the extrusion nozzle is known in the prior art. However, the machinery required for such a method is considerable. Two extruders are needed, joined to a nozzle suitable for the extrusion of a plurality of materials, and the operation of the extruders must be adjusted relative to each other with the greatest precision.

Other prior art describes a method by which a finished prepared film is applied with rollers onto a train or belt of synthetic resin directly after the train leaves a nozzle provided with a broad slit. However, the method cannot be used for preparing film-coated hollow tubes since these would be compressed while they are in a hot condition by the pressure of the rollers. If the film is first applied by rolling after the hollow tubular strand has already passed through a calibration apparatus (in which its dimensions are determined) and has been cooled, in most cases the tube has already suffered surface damage. Further, only films which have been coated with an adhesive will adhere to the cooled strand and such films are relatively expensive.

It is known from still other prior art to coat an extruded hollow synthetic resin tube with a film by applying a film to a flat surface of a wall portion of the hollow tube adjacent an abutment of the extruder mouthpiece and then leading the tube, while still in a plastic condition and coated with the film, through a shaping channel. This method cannot be performed if the hollow thermoplastic tube sticks to the abutment under the pressure with which the film is "ironed on". However, such sticking is the general rule. The conditions under which such sticking can be avoided have not been disclosed in the prior art and are not discoverable with the knowledge of those skilled in the art of extrusion.

The object of the present invention is to coat an extruded hollow synthetic resin tube with a pre-fabricated film such that the film adheres tightly to the tubular strand, while avoiding the disadvantages described above. In this sense, the adhesion is considered tight if a vacuum can be applied to the coated strand without loosening the film.

All known processes for the preparation of film-coated synthetic resin tubes proceed from the need, obviously considered as a matter of course, to unite the film material and the material of the tube under high mechanical pressure. The present invention rests on the surprising recognition that only a comparatively slight pressure is necessary in order to bond the thermoplastic synthetic resin tube tightly with a film and that the pressure with which a hollow tube is usually pressed against the inner walls of a forming channel during its passage therethrough is sufficient for this purpose. Thus, apparatus for application of the film, in addition to that required for forming the tube, is superfluous.

The present invention permits coating a hollow tube with films of nearly any desired kind, and particularly also with cheap uncoated films, in a simple manner with minimal expenditure for apparatus. At the same time, the process of the invention fundamentally excludes surface defects which often occur on passage of a thermoplastic synthetic resin strand through a forming channel.

The synthetic resin strand is preferably flat, at least on that side thereof which is to be coated. Synthetic resin strands having a slightly undulating cross-section can be coated according to the present invention if an elastic film, for example of polyethylene, is employed. The present invention is particularly adapted to the preparation of film-coated hollow tubes comprising two flat outer walls and supports arranged there between.

All those synthetic resins which are suitable for extrusion to form such a strand material can be used, for example polymethyl methacrylate, polyvinyl chloride, polyethylene, impact-resistant polystyrene, or polycarbonate.

The film used for coating preferably also consists of a synthetic resin. In principle, the same materials are used as are used for the strand, but in addition the film may also be of regenerated cellulose, cellulose esters, polyamides, or polyesters, for example. The strand material and the film material can be the same or different synthetic resins and can differ also in their coloration or pigmentation, in their content of flame-inhibiting additives, in their molecular weight, in their toughness, or in other properties which are significant from the point of view of their use. Instead of synthetic resin films, metal foils, paper, or similar film-like materials can be applied. In general, the term "film" in the sense of the present invention should be interpreted as meaning a flat elastic material in the form of a train or strip and having a thickness between 5 microns and 500 microns. In contrast to the known method for the coextrusion of a strand and film from a nozzle accommodating a plurality of materials, the present invention also permits the use of films which are specially pre-treated, for example films printed on their underside or polyolefin films which have been treated by corona discharge.

At that point in time at which the film is applied to the synthetic resin strand, the film must be in a non-plastic condition. This prerequisite is satisfied by films of paper or metal at the operational temperatures which are encountered without further measures having to be taken. Synthetic resin films can, on the other hand, have a melting temperature which is below the temperature of the synthetic resin strand or tube. In this case it is sufficient that at least that surface of the film(*) be beneath its melting temperature until the film is contacted with the synthetic resin strand. It is to be understood that the term "beneath the melting temperature" in this case means beneath the temperature at which the resin enters into a thermoplastic condition.

(*)which is contacted with the forming channel

In preparing the hollow tube, the pressure used to join the tube and film can be generated either by an external reduced pressure or by an increased gas pressure in the interior of the hollow tube, according to choice. An elevated interior gas pressure can be maintained in a manner known per se by closure of the free end of the extruded strand with sliding stoppers, or in other ways, and by introducing compressed gas into the hollow tube cavity by means of a line leading through the extrusion nozzle core. When working with a reduced pressure, a so-called "vacuum calibration apparatus" is used as the forming channel, which apparatus is provided in its inner walls with grooves or perforations which are under a partial or full vacuum while the pressure of atmospheric air within the hollow chambers of the tube provides the necessary compressive pressure. The adhesion between the material of the strand and of the film is more strongly determined by the affinity of the materials themselves than by the magnitude of the compressive pressure, providing that the latter is at all sufficient for effecting bonding of the film with the synthetic resin belt. Thus, it serves no purpose to increase the compressive pressure above 5 or 10 atmospheres since frictional resistance also increases with increasing pressure. In general, pressures far below the aforementioned pressures are used. As a rule, a pressure (for example a reduced pressure in the shaping channel) of 0.01–0.5 atmospheres, preferably from 0.03 to 0.3 atmospheres, is sufficient.

Adhesion is so high even in case of minimal affinity, for example as between polymethyl methacrylate and corona-treated polyethylene, that the film does not come loose during the vacuum calibration or during further working up of the coated strand, for example by deep drawing while in a thermoplastic condition. However, the film can be removed from the strand surface if desired. For materials having high affinity, for example as between polymethyl methacrylate and polycarbonate, a later removal of the film layer is not possible.

Figure 2:
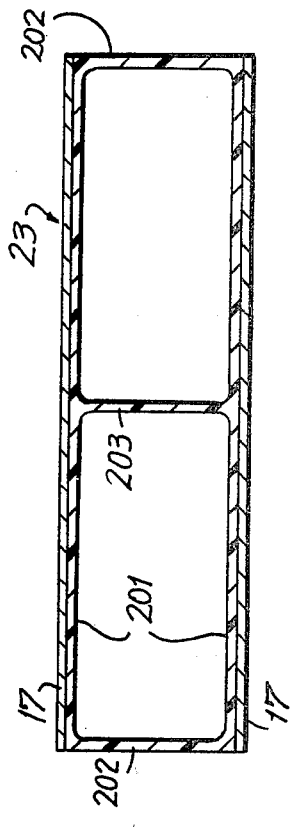

A better understanding of the present invention and of its many advantages will be had by referring to the accompanying drawings, in which FIG. 1 is a side view, in longitudinal section, of apparatus suitable for preparing a film-coated tube according to the present invention; and FIG. 2 is a front elevation, in section taken along line 2—2 of FIG. 1, of a film-coated tube prepared by the present invention.

FIG. 1 shows extrusion apparatus 10 comprising reservoir 11 of thermoplastic synthetic resin and nozzle arrangement 12 including core 13 provided with conduit 14 for compressed gas. As extruded thermoplastic strand 15 leaves nozzle 12 and enters shaping channel 16, film 17 is applied to the upper and lower surfaces thereof through slit 18, which need only be of a width sufficient for film 17 to pass therethrough, i.e. on the order of magnitude of 1 mm. The narrower slit 18 is, the smaller is the tendency for extruded thermoplastic mass 15 to be pressed thereinto. Slit 18 may be only so wide that the melt entrainment current caused by film 17 entering through slit 18 overcomes the leakage current produced by the pressure of material 15 being extruded. This is generally the case for slit widths less than 5 mm.

The interior height 19 of shaping channel 16 corresponds substantially with the dimensions 20 of extrusion nozzle 12. An exact agreement between these two dimensions is in general not necessary, since exiting strand 15, on entry into the shaping channel 16, can be somewhat expanded or attenuated by a slightly-changed velocity of movement. Entry lips 21 of shaping channel 16 are preferably slightly rounded so that film 17 can be easily introduced. The inner walls of shaping channel 16 are provided with temperature-controlling means such as channels 22 so that strand 15 is cooled beneath its softening temperature in a controlled fashion on passage therethrough. Cooled coated strand 23 can then be drawn off from shaping channel 16 by means of rollers 24.

In order to reduce the friction between coated strand 23 and the inner walls of channel 16, a liquid lubricant such as water, glycerine, oil, or an aqueous polymer solution can be applied to the surface of film 17 surface through lubricating grooves 25. Lubrication can occur before the application of film 17 to strand 15, as shown, or after.

If compressive pressure is produced by a compressed gas, the latter can be introduced into the hollow portions of strand 15 through 14. Preferably, however, channel 16 is vacuum operated and has in its inner walls openings 26 through which a vacuum is applied to strand 15 to adhere film 17 to the walls thereof.

As is evident from FIG. 2, extruded film-coated strand 23 comprises upper and lower walls 201 having film coating 17 thereon, supported by end walls 202 and one or more intermediate supports 203.

What is claimed is:

1. A method for making a hollow tube of synthetic resin having an adherent film coating on an exterior surface portion thereof, which method comprises extruding said resin while in a thermoplastic condition to form said hollow tube, applying a pre-formed film coating to an exterior surface portion of said tube by contacting one side of the film coating with the tube while the resin of the tube is thermoplastic, then passing the film and tube through a shaping channel while maintaining atmospheric pressure within said tube and applying a vacuum to the exterior of said tube to create a pressure differential between the interior and exterior of the tube, whereby the tube and the film coating thereon are pressed against the walls of the shaping channel to adhere them, and then cooling the film-coated tube to a temperature below the softening point of the resin of which the tube is formed.

2. A method as in claim 1 wherein said pressure difference is from 0.01 to 0.5 atmosphere.

3. A method as in claim 1 wherein said pressure difference is from 0.03 to 0.3 atmosphere.

4. A method as in claim 1 wherein a liquid lubricant is present on that film side not in contact with the tube during passage of the film and tube through said shaping channel.

5. A method as in claim 1 wherein the temperature of at least that side of the pre-formed film coating which is contacted with said shaping channel is below the melting point of the material of the film prior to its application to the tube.

6. Apparatus for making a hollow tube of synthetic resin having an adherent film coating on an exterior surface portion thereof, said apparatus comprising means for extruding a synthetic resin while in a thermoplastic condition to form said hollow tube, and shaping means, including a shaping channel having means therein for applying a vacuum to the interior of said shaping channel and further having cooling means, said shaping means being in communication with said extruding means for shaping said extruded resin tube while in a thermoplastic condition by pressing the tube against the walls of said shaping channel under a pressure differential generated by said means for applying a vacuum and atmospheric air within said extruded resin tube and then cooling the shaped tube below the softening point of the resin, said shaping means and extruding means being separated to define a narrow slit therebetween, and means for introducing a pre-formed film coating through said slit into said shaping means onto an exterior surface portion of said tube.

7. An apparatus as in claim 6 wherein said extruding means and said shaping means are separated to define a slit therebetween less than 5 mm wide.

* * * * *